Patented June 13, 1944

2,351,247

UNITED STATES PATENT OFFICE 2,351,247

AMINO-SUBSTITUTED COMPOUND OF THE BENZENE SERIES AND METHOD OF MAKING THE SAME

Viktor Weinmayr, Pitman, N. J., assignor to E. I. du Pont de Nemours & Company, Wilmington, Del., a corporation of Delaware No Drawing. Application October 1, 1941, Serial No. 413,167

7 Claims. (Cl. 260—578)

This invention relates to new C-chloroalkyl compounds of the benzene series, and especially to such compounds which have a meta position substituted by amino.

Anilines having nuclearly substituted C-fluoro groups, such as amino-benzo-trifluoride are known but the corresponding chloro compounds cannot be prepared. However, it is desirable to provide anilines which are nuclearly substituted by C-chloro groups for various purposes, such as for use as diazo components for azo dyes where negatively substituted groups are desired.

It is an object of the present invention to provide a class of anilines having nuclearly substituted alkyl groups which are substituted in turn by chlorine. Another object of the invention is to provide new compounds which are especially useful as intermediates for azo dyes. A further object is to provide methods for making the new compounds. Still other objects of the invention will be apparent from the following description.

The objects of the invention are attained in general by preparing meta-nitrophenyl pentachloro ethane and then applying appropriate hydrolyzing and reduction methods whereby different C-chloroalkyl anilines are produced. For example, a reduction of meta-nitrophenyl pentachloro ethane by the action of stannous chloride in the presence of hydrochloric acid produces meta-aminophenyl pentachloro ethane. Reduction by the action of hydrogen in the presence of finely divided nickel produces meta-amino-1',2',2'-trichloro styrene. Meta-amino-1',2',2'-trichloro styrene is also obtained by removing two atoms of chlorine from meta-nitrophenyl pentachloro ethane in an appropriate medium and then reducing the nitro group of the styrene to amino. By heating meta-nitrophenyl-pentachloro ethane with an alcohol in a hydrous alkali metal hydroxide medium, a meta-(1'-alkoxy-1',2',2'-trichloro ethyl) nitrobenzene is formed. The nitro group of this compound is then subsequently reduced to amino in an appropriate reducing medium to form the corresponding aniline.

The invention will be more fully set forth in the following more detailed description which includes examples that are given as illustrative embodiments of the invention and not as limitations thereof. Parts are expressed in parts by weight unless otherwise noted.

Example 1

One hundred two (102) parts of phenyl pentachloro ethane are dissolved in five hundred (500) parts of 95% nitric acid at 20°–25° C. The solution is agitated about one hour and then poured onto 200 parts of ice. The pale yellow precipitate is filtered, washed and dried. One hundred seventeen (117) parts of meta-nitrophenyl pentachloro ethane are obtained, having a melting point range of 109°–113° C. The product is pure enough for further use. Crystallization from eight parts of ethyl alcohol gives the product showing the recorded melting point of 114° C. The crude nitrobody is obtained with a yield of 98.8% of theory. The product is represented by the formula

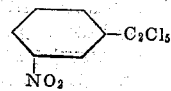

Phenyl pentachloro ethane was prepared by Biltz [Annalen, 296, page 271 (1897)] who reported an unsatisfactory method of preparing the compound. I have now discovered a satisfactory novel method of preparing the compound from alpha-trichloro-acetophenone which comprises heating the acetophenone in the presence of phosphorus pentachloride at a temperature which is sufficient to cause the formation of phosphorus oxychloride and which is sufficient to cause the phosphorus oxychloride to evaporate from the reaction mixture. For example, a mixture composed of 603 parts of alpha-trichloro-acetophenone and 900 parts of phosphorus pentachloride was heated to 170°–180° C. and maintained at this temperature for 24 hours. The phosphorus oxychloride which formed was allowed to distill from the reaction mixture. At the end of the heating period the reaction mass was cooled to 100° C. and poured into 8000 parts of ice and a precipitate of crude phenyl pentachloro ethane was formed.

The product was purified by dissolving the precipitate in 1000 parts of carbon tetrachloride, washing the solution free of acid, drying the solution and then distilling. The purified distillate consisted of 631 parts of phenyl pentachloro ethane which had a distillation constant of 103° C. at 0.5 mm. pressure and a crystallizing temperature of 35.7° C. The yield amounted to 83.6% of theory based on the alpha-trichloro-acetophenone used. The product is represented by the formula

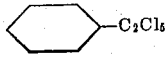

The mixtures of alpha-trichloro-acetophenone and phosphorus pentachloride can be used in various proportions instead of the one enumerated as illustrative and the temperature and duration of heating the mixtures can be varied as long as the temperature is sufficiently high to form phosphorus oxychloride and cause it to be removed from the reaction mixture by distillation.

*Example 2*

A mixture of one hundred sixty-one (161) parts of meta-nitrophenyl pentachloro ethane, three hundred fifty-six (356) parts of stannous chloride, two hundred sixty-seven (267) parts by volume concentrated hydrochloric acid and an equal volume of dioxane is heated and refluxed for one hour. Reduction starts at about 70° C. and slight cooling may be necessary at that temperature to avoid too vigorous reaction. A crystalline slurry of the hydrochloride of meta-amino phenyl pentachloro ethane is formed. About nine thousand (9000) parts of water are then added to dissolve the hydrochloride at the boil. Upon cooling, one hundred fifty-one (151) parts of pure meta-aminophenyl pentachloro ethane are obtained as the hydrochloride in the form of white crystals. The reduction yield is thus 92.5%.

The product can be isolated in the form of the free base by pouring the reduction mass onto one thousand five hundred (1500) parts of 40% caustic soda. The free amine which precipitates is dissolved in one thousand two hundred fifty (1250) parts of ether, the resulting solution is washed, dried with calcium chloride and evaporated to dryness. One hundred forty (140) parts of crude meta-aminophenyl pentachloro ethane are obtained (98.8% yield) melting from 65°-70° C. The product may be crystallized from alcohol or gasoline and is then obtained pure with a melting point of 70° C.

The free base is represented by the formula

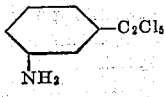

Alcohol can be used as an inert solvent to facilitate reduction in place of dioxane.

*Example 3*

A mixture of sixty-four and one-half (64.5) parts of meta-nitrophenyl pentachloro ethane, twenty (20) parts of nickel catalyst, two (2) parts of hydroquinone, and two hundred fifty (250) parts by volume of thiophene-free benzene are heated in a closed pressure vessel to 100° C. A pressure of six hundred (600) pounds of hydrogen is maintained in the vessel until the hydrogen absorption has stopped. The reaction mass is poured into water and the benzene is distilled with steam. The residual oily residue is dissolved in about three hundred (300) parts of ether. The ether solution is filtered, dried well with calcium chloride and saturated with hydrogen chloride to separate the product from unreduced nitro bodies. Nineteen (19) parts of 1',2',2'-trichloro meta-amino styrene are precipitated as the hydrochloride giving a 36.5% yield. The amine is soluble to a clear solution in dilute hydrochloric acid. It appears to hydrolyze in part to the free base when heated in water.

The 1',2',2'-trichloro meta-amino styrene is prepared from the hydrochloride by the action of aqueous ammonia by methods known to the art. It forms an oil distilling at about 140°/0.1 mm. The free base is represented by the formula

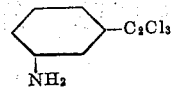

The ether filtrate from which the 1',2',2'-trichloro meta-amine-styrene was precipitated as the hydrochloride may be evaporated to dryness. By treating the residue with alcohol and recrystallizing, twenty (20) parts of pure meta-nitrophenyl pentachloro ethane may be recovered for reuse. By using a greater proportion of nickel catalyst, an increased yield of the amine may be obtained.

*Example 4*

Thirty-two (32) parts of a 32% solution of sodium sulfhydrate are slowly added over a period of 90 minutes to the boiling solution of thirty-two (32) parts of meta-nitrophenyl pentachloro ethane in five hundred (500) parts of ethyl alcohol. The charge is cooled to 10° C. after having been refluxed an additional 90 minutes. The crystalline precipitate is filtered and washed with about fifty (50) parts by volume of ethyl alcohol. This precipitate consists largely of sulfur and is discarded. The filtrate is evaporated and the residue obtained is extracted with benzene. Twenty (20) parts of crude 1',2',2'-trichloro meta-nitro styrene are obtained upon evaporation of the benzene. Crystallization from forty (40) parts of ethyl alcohol gives pure 1',2',2'-trichloro meta-nitro styrene melting at 66° C. The product is represented by the formula

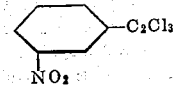

1',2',2'-trichloro meta-nitrostyrene can also be obtained in excellent yields by the following method. Forty (40) parts of meta-nitrophenyl pentachloro ethane, two hundred forty (240) parts by volume of methyl alcohol, and forty (40) parts of calcium carbonate are charged into a pressure vessel. The temperature is raised to 150° C. over a period of six hours and maintained at 150° C. for two hours. The reaction mass is freed of alcohol by evaporation, the residue is taken up in five hundred (500) parts of benzene and dried with anhydrous sodium sulfate. The filtered solution is evaporated and the crystalline residue obtained is freed from a slight amount of oily impurities by pressing it out on a porous plate. Twenty-six (26) parts of pure 1',2',2'-trichloro meta-nitrostyrene are obtained equal to a yield of 83.6% of theory.

*Example 5*

A solution of one hundred (100) parts of meta-nitrophenyl pentachloro ethane, fifty (50) parts of potassium hydroxide in eight hundred (800) parts by volume of ethyl alcohol, and two hundred (200) parts of water is refluxed for 24 hours, and then cooled to 10° C. Eighty-three (83) parts of crude meta-(1'-ethoxy-1',2',2'-trichloroethyl) nitrobenzene melting at about 100° C. is obtained, equal to a yield of 90.5% of theory.

Crystallization from seven parts of ethyl alcohol per part of nitro body gives the pure compound melting at 105° C. Crystallization from non-alcoholic solvents such as gasoline does not change the analysis or melting point of the compounds. The product is represented by the formula

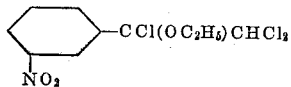

By using an equivalent amount of a one- or three-carbon alcohol, such as methyl or propyl alcohol instead of ethyl alcohol, the corresponding alkoxy derivatives are produced.

*Example 6*

Forty (40) parts of meta-(1'-ethoxy-1',2',2'-trichloro ethyl)nitrobenzene, five (5) parts of calcium carbonate, ten (10) parts of nickel catalyst and two hundred fifty (250) parts by volume of methyl alcohol are heated in a closed pressure vessel to 100° C. A pressure of 600 pounds of hydrogen is maintained in the vessel until no further absorption of hydrogen takes place. The alcohol is removed by evaporation and the residue obtained is heated with one hundred fifty (150) parts of water to the boil and cooled to 5° C. by adding ice. The precipitate formed is filtered and dissolved in five hundred (500) parts of ether. The ether solution is dried, and evaporated to dryness. The residue (15 parts) is crystallized from 30 parts of gasoline. Twelve (12) parts of pure meta-(1'-ethoxy-1',2',2'-trichloro ethyl) aniline are obtained melting at 85° C. The product is represented by the formula

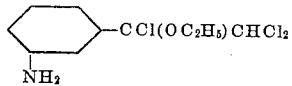

By using an equivalent amount of meta-(1'-methoxy-1',2',2'-trichloroethyl)-nitrobenzene or meta-(1'-propoxy-1',2',2'-trichloro ethyl)-nitrobenzene instead of the ethoxy derivative used in the foregoing example, the corresponding meta-(1'-alkoxy-1',2',2'-trichloroethyl)-aminobenzenes are produced.

In various of the processes hereinbefore described, inert organic solvents are used, such as methyl, ethyl and propyl alcohol. It is to be understood that any inert organic solvent can be used in the processes referred to instead of the inert solvents specifically mentioned. The term inert organic solvent as used in the specification and claims refers to an organic solvent for the material which is acted upon in the process and which does not enter into the reaction except as a solvent.

From the foregoing disclosure it will be recognized that the invention is susceptible of modification without departing from the spirit and scope thereof and it is to be understood that the invention is not restricted to the specific illustrations thereof herein set forth.

I claim:

1. An aniline represented by the formula:

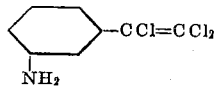

2. An aniline represented by the formula:

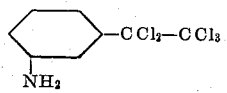

3. An aniline represented by the formula:

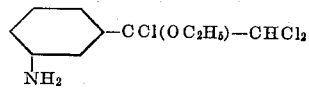

4. The process of making a meta-amino-benzene which comprises heating meta-nitrophenyl-pentachloro ethane at a temperature sufficient to reduce the nitro group in the presence of an inert solvent for said benzene compound and a reducing agent until the nitro group is reduced to amino.

5. The process in accordance with claim 4 wherein the reducing agent is stannous chloride, the medium is strongly acid with hydrochloric acid and the mixture is heated until meta-amino phenyl pentachloro ethane is formed.

6. A primary amino-benzene in which a substituent group meta to —NH$_2$ is a chloro-aliphatic group having two nuclear carbons, both carbons of which are substituted by chloro, said chloro-aliphatic group containing 3 to 5 chloro substituents.

7. A primary amino-benzene in accordance with claim 6 in which the meta substituted group is chloro-alkyl.

VIKTOR WEINMAYR.